(12) United States Patent
Meyerhoff

(10) Patent No.: US 11,729,730 B2
(45) Date of Patent: Aug. 15, 2023

(54) METHOD FOR SYNCHRONIZING WIRELESS NETWORK NODES AND WIRELESS COMMUNICATION NETWORK

(71) Applicant: AIRBUS DEFENCE AND SPACE GMBH, Taufkirchen (DE)

(72) Inventor: Thomas Meyerhoff, Hamburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 157 days.

(21) Appl. No.: 17/203,067

(22) Filed: Mar. 16, 2021

(65) Prior Publication Data

US 2021/0297963 A1    Sep. 23, 2021

(30) Foreign Application Priority Data

Mar. 18, 2020    (EP) ..................................... 20163878

(51) Int. Cl.
*H04W 56/00* (2009.01)
*H04W 84/06* (2009.01)
(Continued)

(52) U.S. Cl.
CPC ........... *H04W 56/001* (2013.01); *G01S 7/415* (2013.01); *H04J 13/0062* (2013.01); *H04W 84/06* (2013.01)

(58) Field of Classification Search
CPC ............. H04W 56/0015; H04W 56/001; H04J 13/0062; G01S 7/4021; G01S 13/003; G01S 7/006; G01S 13/32; G01S 13/87
See application file for complete search history.

(56) References Cited

U.S. PATENT DOCUMENTS

2005/0114023 A1* 5/2005 Williamson ....... G01C 21/1656
701/472
2016/0047892 A1* 2/2016 Franceschini ......... G01S 13/003
342/60

(Continued)

FOREIGN PATENT DOCUMENTS

EP    3 182 771 A1    6/2017

OTHER PUBLICATIONS

Extended European Search Report for Application No. 20163878.0 dated Sep. 2, 2020.

*Primary Examiner* — Yee F Lam
(74) *Attorney, Agent, or Firm* — KDW Firm PLLC

(57) ABSTRACT

A method for synchronizing wireless network nodes of a wireless communication network involves a base station of the wireless communication network to determine or obtain a maximum value for a frequency content per unit of time of an FMCW radio-frequency signal interfering with the wireless communication network, transmit a first synchronization frame containing a first synchronization sequence in a first wireless communication frequency bandwidth, and transmit a second synchronization frame simultaneously to the first synchronization frame, the second synchronization frame containing a second synchronization sequence in a second wireless communication frequency bandwidth that is spaced apart from the first wireless communication frequency bandwidth by a spectral distance larger or equal to the product of the determined maximum value for the frequency content per unit of time of the FMCW radio-frequency signal and duration of the first and second synchronization sequences.

15 Claims, 2 Drawing Sheets

(51) Int. Cl.
*G01S 7/41* (2006.01)
*H04J 13/00* (2011.01)

(56) References Cited

U.S. PATENT DOCUMENTS

| | | | |
|---|---|---|---|
| 2017/0317816 A1* | 11/2017 | Lei | H04L 7/041 |
| 2019/0215058 A1* | 7/2019 | Smyth | H04B 7/18502 |
| 2019/0349426 A1* | 11/2019 | Smith | H04L 9/0825 |
| 2020/0293837 A1* | 9/2020 | Browning | G01S 13/003 |
| 2021/0275050 A1* | 9/2021 | Ren | H04Q 9/00 |
| 2021/0399936 A1* | 12/2021 | Williams | H04L 27/0008 |
| 2021/0405183 A1* | 12/2021 | Vossiek | G01S 13/003 |
| 2022/0155437 A1* | 5/2022 | Alsharif | G01S 15/52 |

* cited by examiner

METHOD FOR SYNCHRONIZING WIRELESS NETWORK NODES AND WIRELESS COMMUNICATION NETWORK

CROSS-REFERENCE TO RELATED APPLICATION

This application claims priority to European Patent Application Serial No. 20163878.0 filed Mar. 18, 2020, the entire disclosure of which is incorporated by reference herein.

TECHNICAL FIELD

The present disclosure relates to methods for synchronizing wireless network nodes as well as to wireless network nodes of a wireless communication network and a wireless communication network, particularly for establishing wireless communication in frequency ranges overlaid by interfering FMCW type radio signals.

Although applicable for any kind of airborne vehicle, the disclosure herein and the corresponding underlying problems will be explained in further detail in conjunction with an aircraft. Airborne vehicles within the meaning of this disclosure include all types of vehicles that may be propelled through the air by force and/or supported by aerodynamic forces. Moreover, the disclosed methods, systems and devices may be used in any type of wireless network and may be implemented for applications outside the avionic field, such as in naval vehicles such as ships, ground-based vehicles such as cars, trucks, trains, and/or stationary or quasi-stationary settings such as buildings, manufacturing sites, public places or similar.

BACKGROUND

Wireless communication networks have network nodes communicating on radio frequencies in a frequency spectrum that may have to be shared with other applications. Such other applications may for example be Frequency-Modulated Continuous Wave (FMCW) radar sensors. An FMCW radar sensor radiates continuous transmission power like a simple continuous wave radar but changes its operating frequency during the measurement. The change of operating frequency occurs over a dedicated radio frequency spectrum of the FMCW radar sensor.

The frequency modulation of an FMCW radar sensor is used to transmit probing radar signals which increase or decrease in the frequency periodically. When an echo signal is received by the FMCW radar sensor the change of frequency causes a time delay manifesting as difference in phase or frequency between the actually transmitted and the received signal.

Wireless communication network nodes are commonly synchronized by transmitting synchronization information between participating network nodes in order to successfully demodulate the receive signal and avoid communication signal collisions between communication signals of the network nodes themselves. If a wireless communication network needs to share a frequency spectrum with one or more FMCW radar sensors, the network nodes may additionally to be synchronized so that communications between the nodes are not interfering with the probing signals of the FMCW radar sensor.

Conventionally, synchronization frames having a constant frequency periodic pulse acting as timing beacon is used in such wireless communication networks. However, measures need to be put in place to avoid that the probing signal of the interfering FMCW radar sensor will occupy the frequency on which the timing beacon is transmitted at exactly the same moment. If that were to happen frequently the network nodes are unable to receive the timing beacon, thus running the risk to move out of synchronization.

A prior art approach to combat this problem is disclosed in document EP 3 182 771 A1 which teaches using arbitrary timing synchronization beacons. There is, however, a need for less complicated solutions that do not rely on highly time-resolved knowledge of the interfering FMCW type radio signals.

SUMMARY

It is one of the objects of the disclosure herein to improve synchronization in a wireless data transmission system enabling precise timing and frequency offset estimation in frequency ranges that are subject to interference by FMCW type radio signals enabling the wireless data transmission system to communicate in presence of interfering FMCW type radio signals.

According to a first aspect of the disclosure herein a method for synchronizing wireless network nodes of a wireless communication network involves a sending network node of the wireless communication network to perform the steps of determining or obtaining a maximum value for a frequency content per unit of time of at least one frequency-modulated continuous wave, FMCW, radio-frequency, RF signal, such as for example a FMCW radar probing signal, interfering with the wireless communication network; transmitting a first synchronization frame containing a first synchronization sequence in a first wireless communication frequency bandwidth; and transmitting at least one second synchronization frame simultaneously to the first synchronization frame in a wireless communication signal, the at least one second synchronization frame containing a second synchronization sequence in a second wireless communication frequency bandwidth, the second wireless communication frequency bandwidth being spaced apart from the first wireless communication frequency bandwidth by a spectral distance that is larger or equal to the product of the determined maximum value for the frequency content per unit of time of the at least one FMCW RF signal and the duration of the first and second synchronization sequences. The method further then involves at least one receiving wireless network node of the wireless communication network to perform the steps of receiving the wireless communication signal containing the first synchronization frame and the at least one second synchronization frame; filtering the wireless communication signal for the first synchronization frame in the first wireless communication frequency bandwidth and for the at least one second synchronization frame in the second wireless communication frequency bandwidth; applying a correlation function to the first and at least one second synchronization sequences contained in the received and filtered first and at least one second synchronization frames to determine first and second timing metrics associated with the first and at least one second synchronization sequences, respectively; applying a binary hypothesis test to each of the first and at least one second timing metrics to determine whether or not the received and filtered first and at least one second synchronization frames have been interfered by the at least one FMCW RF signal; and selecting at least one of the received and filtered first synchronization frame and the at least one second synchronization frame for synchronizing the at least one receiving wireless network node with the sending wireless network node based on the outcome of the applied binary hypothesis test so that synchronization frames that are not interfered by the at least one FMCW RF signal are identified and selected.

According to a second aspect of the disclosure herein a sending wireless network node for use in a wireless communication network interfered by FMCW type radio signals is configured to: determine or obtain a maximum value for a frequency content per unit of time of at least one frequency-modulated continuous wave, FMCW, radio-frequency, RF signal, such as for example an FMCW radar probing signal, interfering with the wireless communication network; transmit a first synchronization frame containing a first synchronization sequence in a first wireless communication frequency bandwidth; and transmit at least one second synchronization frame simultaneously to the first synchronization frame in a wireless communication signal, the at least one second synchronization frame containing a second synchronization sequence in a second wireless communication frequency bandwidth, the second wireless communication frequency bandwidth being spaced apart from the first wireless communication frequency bandwidth by a spectral distance that is larger or equal to the product of the determined maximum value for the frequency content per unit of time of the at least one FMCW RF signal and the duration of the first and second synchronization sequences.

According to a third aspect of the disclosure herein a wireless network node for use in a wireless communication network interfered by FMCW type radio signals is configured to: receive a wireless communication signal from a sending wireless network node in the wireless communication network containing a first synchronization frame and at least one second synchronization frame simultaneously to the first synchronization frame, the first synchronization frame containing a first synchronization sequence in a first wireless communication frequency bandwidth, and the at least one second synchronization frame containing a second synchronization sequence in a second wireless communication frequency bandwidth, the second wireless communication frequency bandwidth being spaced apart from the first wireless communication frequency bandwidth by a spectral distance that is larger or equal to the product of a determined maximum value for the frequency content per unit of time of the at least one FMCW RF signal and the duration of the first and second synchronization sequences; filter the wireless communication signal for the first synchronization frame in the first wireless communication frequency bandwidth and for the at least one second synchronization frame in the second wireless communication frequency bandwidth; apply a correlation function to the first and second synchronization sequences contained in the received and filtered first and second synchronization frames to determine first and second timing metrics associated with the first and second synchronization sequences, respectively; apply a binary hypothesis test to each of the first and second timing metrics to determine whether or not the received and filtered first and second synchronization frames have been interfered by the at least one FMCW RF signal; and select at least one of the first synchronization frame and the at least one second synchronization frame for synchronizing the wireless network node with the sending wireless network node based on the outcome of the applied binary hypothesis test so that synchronization frames that are not interfered by the at least one FMCW RF signal are identified and selected.

According to a fourth aspect of the disclosure herein a wireless communication network includes at least one wireless network node according to the third aspect of the disclosure herein, and at least one wireless network node according to the second aspect of the disclosure herein.

According to a fifth aspect of the disclosure herein an aircraft includes a wireless communication network according to the fourth aspect of the disclosure herein.

One idea of the disclosure herein is to exploit the fact that FMCW type radio signals that possibly interfere with the communication in a wireless communication network only occupy frequencies in a certain limited frequency range per unit of time. Thus, if a number of synchronization frames that are transmitted simultaneously are spread apart far enough in the frequency domain, the FMCW type radio signal will, in the worst case, only be able to interfere with one of the frequency bandwidths in which the synchronization frames are transmitted. In other words, at any given point in time there will always be a synchronization frame at a frequency bandwidth that remains unaffected by the FMCW type radio signal.

To make sure that the FMCW type radio signal does not affect more than one of the simultaneously transmitted synchronization frames, the duration and frequency spread of the synchronization frames need to be aligned with the worst case properties of the FMCW type radio signal. Therefore, the simultaneously transmitted synchronization frames will be transmitted on non-overlapping wireless communication frequency bandwidths which are spaced apart by a predetermined spectral distance the value of which depends on the maximum value for the frequency content per unit of time of the FMCW type radio signal. If this maximum value for the frequency content per unit of time is larger, then either the spectral distance needs to be selected larger or the duration of the synchronization sequences in the simultaneously transmitted synchronization frames need to be selected shorter.

Since there is always at least one synchronization frame that remains unaffected by any FMCW type radio signal, this synchronization frame may be selected for accurately determining timing and/or frequency offsets after filtering. These determined timing and/or frequency offsets may then be used to adjust the received wireless communication signals. The selection of the unaffected synchronization frames may for example be performed by adequate test to determine whether or not the FMCW type radio signal has interfered during transmission of the synchronization frame in the respective frequency bandwidths. One advantage of the procedure of the disclosure herein is that proper synchronization can be guaranteed at all times, even if an FMCW type radio signal eventually generates disturbances or interferences for some of the transmitted synchronization frames.

In some embodiments of the first to fourth aspects of the disclosure herein, the first and second synchronization sequences may be constant amplitude zero autocorrelation, CAZAC, waveforms. In several embodiments thereof, the first and second synchronization sequences may in particular be Frank-Zadoff-Chu sequences, Walsh-Hadamard codes, Barker sequences, prime length Legendre sequences or Neuman-Hoffmann sequences.

In some embodiments of the first and third aspect of the disclosure herein, the receiving wireless network node applying the correlation function to the first and second synchronization sequences may include the wireless network node applying an autocorrelation function to the first and second synchronization sequences.

In some embodiments of the first and third aspect of the disclosure herein, synchronizing the at least one receiving wireless network node with the sending wireless network node may include the receiving wireless network node determining a time offset defining the starting point of the at least one selected synchronization frame.

In some embodiments of the first and third aspect of the disclosure herein selecting at least one of the first synchronization frame and the at least one second synchronization frame may include selecting a set of synchronization frames. In several embodiments thereof, synchronizing the at least one receiving wireless network node with the sending wireless network node may include the receiving wireless network node determining a set of time offsets defining the starting points of the set of synchronization frames and determining an average time offset for the determined set of time offsets.

In some embodiments of the first and third aspect of the disclosure herein, synchronizing the at least one receiving wireless network node with the sending wireless network node may include the receiving wireless network node determining a frequency offset between the synchronization frames transmitted by the sending wireless network node and the received synchronization frames at the at least one receiving wireless network node. In several embodiments thereof, synchronizing the at least one receiving wireless network node with the sending wireless network node may include the receiving wireless network node determining a set of frequency offsets and determining an average frequency offset for the determined set of frequency offsets.

BRIEF DESCRIPTION OF THE DRAWINGS

Embodiments of this disclosure will now be described, by way of non-limiting example, with reference to the accompanying drawings. The disclosure herein will be explained in greater detail with reference to exemplary embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding similar parts.

DETAILED DESCRIPTION

The following description of certain embodiments presents various descriptions of specific embodiments. Although specific embodiments have been illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein. Moreover, it will be understood that certain embodiments can include more elements than illustrated in a drawing and/or a subset of the elements illustrated in a drawing. Further, some embodiments can incorporate any suitable combination of features from two or more drawings.

Figure 1:
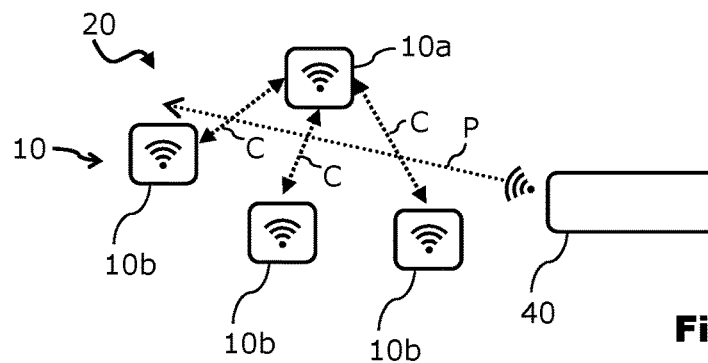
FIG. 1 illustrates a wireless communication network having a plurality of network nodes interfered by FMCW type radio signals according to some embodiments of the disclosure herein.

FIG. 1 illustrates a wireless communication network 20 having a plurality of network nodes 10. The plurality of network nodes includes sending network nodes 10a, of which only a single one is exemplarily depicted in FIG. 1 for reasons of clarity. The sending network nodes 10a may for example be common nodes participating in the communication network 20. It may also be possible that the sending network nodes 10a are specific nodes, such as a base station of the wireless communication network 20. The plurality of network nodes also includes receiving network nodes 10b that are in wireless communication with the sending network nodes 10a. Each of the network nodes 10a and 10b may for example be avionics devices, wirelessly communicating sensors, personal electronic devices or any other type of device capable of communicating wirelessly. It may for example be possible that the function of a sending network node 10a or, in specific cases, of the base station 30, may be taken over by any one of the plurality of network nodes 10a and 10b. Such transfer of functionality may for example be helpful for setting up a mobile ad-hoc network (MANET). MANETs are self-organizing and dynamic networks that may be created anywhere with just two nodes capable of ad-hoc networking so that a centralized infrastructure is not necessarily required.

Figure 5:
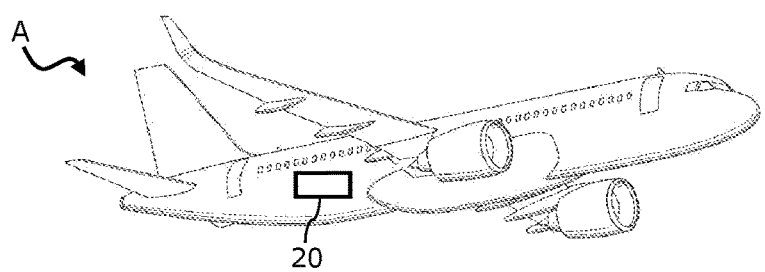
FIG. 5 illustrates an aircraft having a wireless communication network according to some embodiments of the disclosure herein.

The wireless communication network 20 depicted in FIG. 1 may be operable in a specific or a number of specific frequency bands. For example, the wireless communication network 20 may be configured to operate in one or more frequency bands dedicated to wireless avionics intra-communications (WAIC). Such frequency bands may for example be in the range between 960 MHz and 15.7 GHz. As a particular example, the wireless communication network 20 may be configured to process wireless communication signals in the frequency range between 4.200 MHz and 4.400 MHz. Of course, other frequency ranges may be applicable for the wireless communication network 20 as well. The wireless communication network 20 of FIG. 1 may for example be employed in an aircraft, such as the aircraft A exemplarily illustrated in FIG. 5.

The communication between the different network nodes 10a and 10b may be facilitated by any channel access method that enables more than two network nodes 10 connected to the same transmission medium to transmit over share the capacity of the transmission medium. Examples for such channel access methods are frequency-division multiple access (FDMA), time division multiple access (TDMA), code division multiple access (CDMA), spread spectrum multiple access (SSMA), orthogonal frequency-division multiple access (OFDMA) and space-division multiple access (SDMA).

Figure 2A:
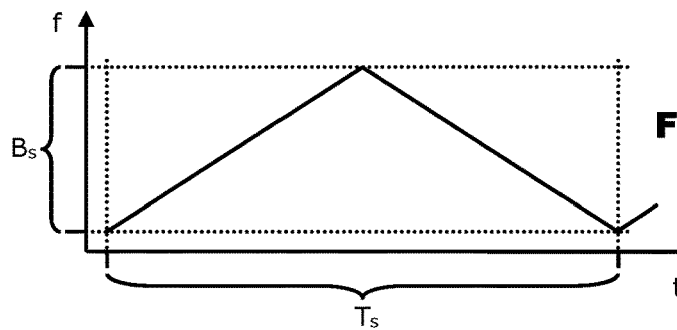
FIG. 2A illustrates an example of a triangle waveform of an FMCW radar sensor probing signal.
Figure 2B:
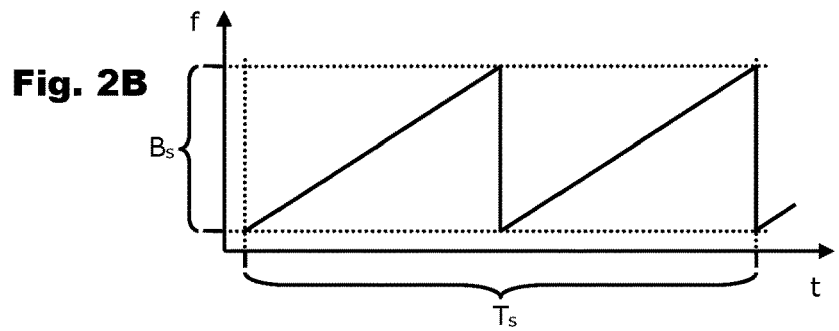
FIG. 2B illustrates an example of a sawtooth waveform of an FMCW radar sensor probing signal.
Figure 2C:
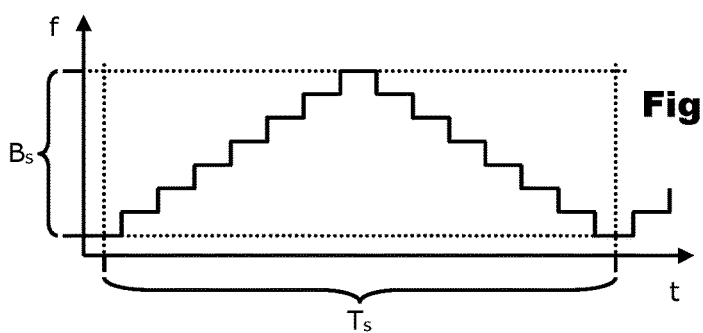
FIG. 2C illustrates an example of a stepped frequency waveform of an FMCW radar sensor probing signal.

Examples of such competing devices are FMCW radar sensors, such as for example an FMCW radar device 40 depicted in FIG. 1. The exemplary FMCW radar device 40 may for example emit a probing signal P that interferes with the communication signals C between the sending wireless network node 10*a* and one or more of the receiving wireless network nodes 10*b*. Exemplary FMCW radar sensor probing signals are illustrated in FIGS. 2A to 2C. FIG. 2A illustrates an example of a triangle waveform of an FMCW radar sensor probing signal, FIG. 2B illustrates an example of a sawtooth waveform of an FMCW radar sensor probing signal, and FIG. 2C illustrates an example of a stepped frequency waveform of an FMCW radar sensor probing signal.

In each of the cases, the frequency f of the FMCW radar sensor probing signal changes continuously or at least stepwise over time t and within a certain sweep bandwidth $B_S$. A frequency content $R_S$ per unit of time of the FMCW radar sensor probing signal, i.e. the amount of frequency deviation during the duration of the unit of time, is given by $R_S=2B_S/T_S$, where $T_S$ is twice the duration of a full sweep of the FMCW radar sensor probing signal from one end of the sweep bandwidth range $B_S$ to the other. Triangle and stepped frequency waveforms (FIGS. 2A and 2C) may comprise a series of alternating up-chirps and down-chirps, while FMCW radar sensor probing signals with sawtooth waveforms may comprise either only up-chirps (see FIG. 2B) or only down-chirps.

The sending wireless network node 10*a* of the wireless communication network 20 of FIG. 1 may determine or otherwise obtain a maximum value $R_{Smax}$ of this frequency content $R_S$ per unit of time for each FMCW RF signal, such as an FMCW radar probing signal P that may interfere with the wireless communication network 20. For example, the sending wireless network node 10*a* may gather information about FMCW radar sensors, such as the exemplary device 40 of FIG. 1, in the vicinity of the wireless communication network 20. It may in some case be possible that information about such FMCW RF devices is already known and pre-configured in the sending wireless network node 10*a*. Based on this determined maximum value $R_{Smax}$, the sending wireless network node 10*a* may send out at least two synchronization frames in different wireless communication frequency bandwidths $B_P$ simultaneously.

Figure 3A:
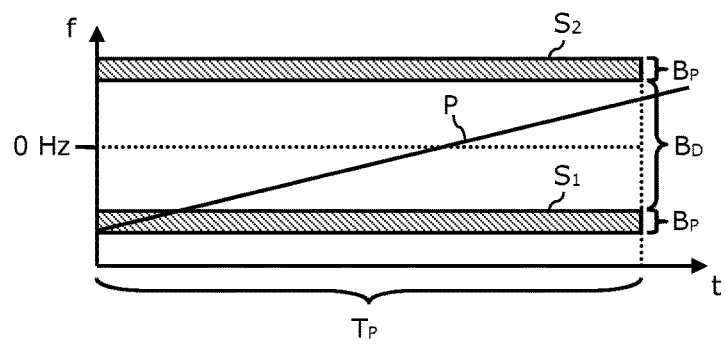
FIG. 3A illustrates a timing diagram of a synchronization frame for wireless network nodes in a wireless communication network in the presence of an interfering FMCW radar sensor probing signal.

FIG. 3A illustrates the simplest example of two simultaneously transmitted synchronization frames in baseband. A first synchronization frame contains a first synchronization sequence $S_1$ and a second synchronization frame contains a second synchronization sequence $S_2$. The two different and non-overlapping wireless communication frequency bandwidths or ranges $B_P$ are spaced apart from each other by a spectral distance $B_D$. The spectral distance $B_D$ is selected to be larger or equal to the product of the determined maximum value $R_{Smax}$ for the frequency content $R_S$ per unit of time and the duration $T_P$ of the first and second synchronization sequences $S_1$ and $S_2$. The wireless communication frequency bandwidths or ranges $B_P$ may be selected appropriately long for a proper synchronization to occur and the duration $T_P$ of the first and second synchronization sequences $S_1$ and $S_2$ may depend on the selected synchronization algorithm. The spectral distance $B_D$ may be adapted based on the given duration $T_P$ and the determined maximum value $R_{Smax}$.

As can be seen from FMCW RF signal P exemplarily illustrated in FIG. 3A, during the duration $T_P$ of the first and second synchronization sequences $S_1$ and $S_2$ the FMCW RF signal P ranges over frequencies that only interfere with the synchronization sequence $S_1$ in the worst case. The synchronization sequences $S_2$ is left un-affected by the FMCW RF signal P. Selecting the spectral distance $B_D$ to account for the maximum possible frequency content $R_S$ per unit of time of the FMCW RF signal P ensures that a precise synchronization between the sending wireless network node 10*a* and any receiving wireless network node 10*b* is always possible, regardless of the presence of an interfering FMCW RF signal P.

Figure 3B:
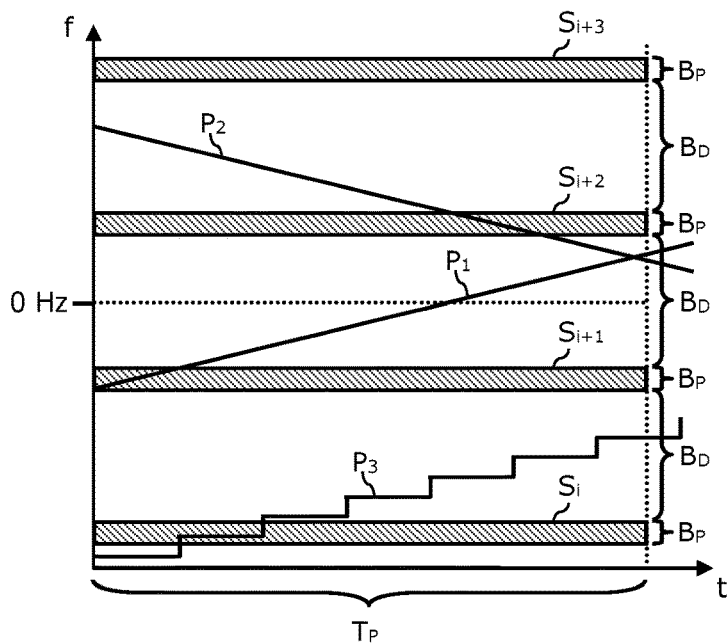
FIG. 3B illustrates a timing diagram of a synchronization frame for wireless network nodes in a wireless communication network in the presence of multiple interfering FMCW radio-frequency signals.

FIG. 3B illustrates a scenario in baseband where more than two synchronization frames are simultaneously transmitted by a sending wireless network node 10*a*. Exemplarily, FIG. 3B depicts four synchronization frames $S_i$ to $S_{i+3}$, each of the four synchronization frames being spaced apart by a full spectral distance $B_D$ with respect to its neighboring synchronization frame. The number N of synchronization frames may be more or less than four and may in any case account for a number of N−1 interfering FMCW RF signals P, of which three FMCW RF signals $P_1$, $P_2$ and $P_3$ are exemplarily illustrated in FIG. 3B.

As can be seen from FIG. 3B, the FMCW RF signals $P_1$, $P_2$ and $P_3$ are interfering with only one synchronization frame each in the worst case scenario due to the selection of the spectral distance $B_D$. In the depicted example, synchronization frames $S_i$ to $S_{i+2}$ are affected by FMCW RF signals, while the fourth synchronization frame $S_{i+3}$ remains unaffected. Thus, for purposes of synchronization between the sending wireless network node 10*a* and the receiving wireless network nodes 10*b*, synchronization frame $S_{i+3}$ may be selected in the scenario of FIG. 3B. Of course, it should be clear that over the course of time, the FMCW RF signals $P_1$, $P_2$ and $P_3$ may affect different sets of synchronization frames $S_i$ to $S_{i+3}$ and that for each simultaneous transmission of synchronization frames $S_i$ to $S_{i+3}$ different ones of the synchronization frames may remain unaffected.

Figure 4:
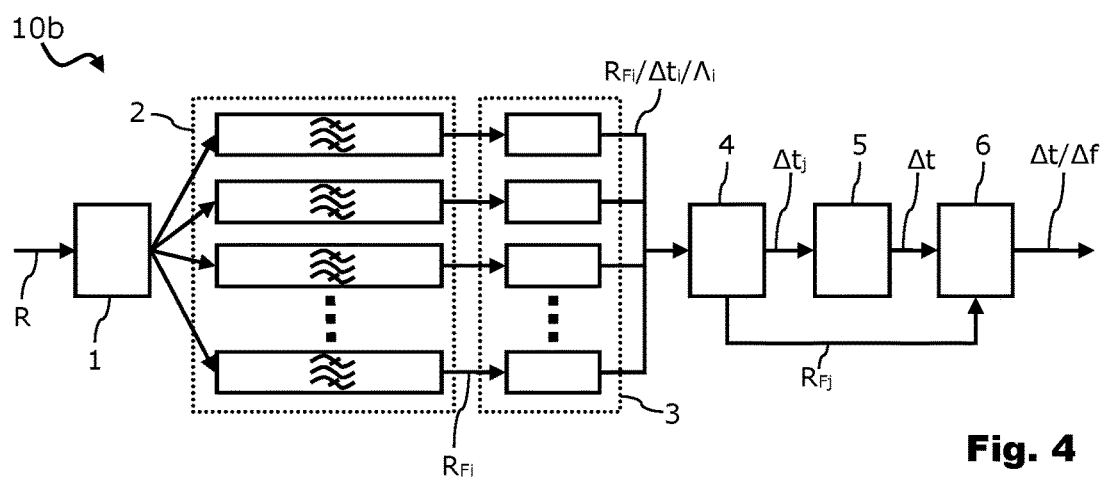
FIG. 4 schematically illustrates a block diagram of a receiving wireless network node to be used in a wireless communication network as illustrated in FIG. 1.

FIG. 4 illustrates a schematic and simplified block diagram of a receiver section of a wireless network node 10 for use in a wireless communication network 20 interfered by FMCW type radio signals, such as the wireless communication network 20 of FIG. 1. The wireless network node 10 includes an input multiplexer 1 for receiving an incoming wireless communication signal R. The input multiplexer 1 is coupled to a downstream filter bank 2. The filter bank 2 comprises a multiplicity of bandpass filters arranged in parallel to each other, each of the multiplicity of bandpass filters being configured to filter to disjoint frequency bandwidths. The bandpass filters may be dynamically adapted in their filter properties, specifically in their pass frequency ranges. The bandpass filters may be configured to suppress frequency components outside the respectively preconfigured or adapted passband of the bandpass filters. The bandpass filters are fed with the incoming wireless communication signal R by the input multiplexer 1 and are used to extract synchronization sequences transmitted in a synchronization frame of the wireless communication signal R. Each of the bandpass filters in the filter bank 2 is used to extract synchronization sequences corresponding to a separate wireless communication frequency bandwidth $B_P$.

For example, a first of the bandpass filters in the filter bank 2 is configured to filter for a first synchronization frame containing a first synchronization sequence $S_1$ in a first wireless communication frequency bandwidth $B_P$, and a second of the bandpass filters in the filter bank 2 is configured to filter for a second synchronization frame transmitted simultaneously to the first synchronization frame in the wireless communication signal R, the second synchronization frame containing a second synchronization sequence $S_2$ in a second wireless communication frequency bandwidth $B_P$. The first and second wireless communication frequency bandwidths $B_P$ are spaced apart by a spectral distance $B_D$ that is larger or equal to the product of a determined maximum value $R_{Smax}$ for the frequency content $R_S$ per unit of time of a FMCW RF signal P and the duration $T_P$ of the first and second synchronization sequences $S_1$, $S_2$. Correspondingly, the pass frequency ranges of the bandpass filters in the filter bank 2 may be adjusted to be spaced apart by the spectral distance $B_D$ as well. The components of the filter bank 2 are designed so that signal components of the synchronization sequences $S_1$, $S_2$ are preserved in the frequency domain and any other signal components or noise are suppressed in the frequency domain.

Generally, the number of bandpass filters in the filter bank 2 may correspond to the number i of synchronization sequences being sent in the incoming wireless communication signal R.

A number of correlators in a correlator bank 3 are coupled downstream of each of the multiplicity of bandpass filters in the filter bank 2. The correlators in the correlator bank 3 each receive a correspondingly bandpass filtered wireless communication signal $R_{Fi}$ from a respective one of the bandpass filters in the filter bank 2. The number of correlators in the correlator bank 3 may equally correspond to the number i of synchronization sequences being sent in the incoming wireless communication signal R and, hence, to the number of bandpass filters in the filter bank 2. The correlators in the correlator bank 3 are each configured to apply a correlation function, such as an autocorrelation function, to the bandpass filtered wireless communication signal $R_{Fi}$. Should there be synchronization frames containing synchronization sequences $S_1$, $S_2$ in the bandpass filtered wireless communication signal $R_{Fi}$, the correlators will be able to determine timing metrics $\Lambda_i$ which are associated with the respective synchronization sequences $S_1$ of the synchronization frames in the bandpass filtered wireless communication signal $R_{Fi}$.

The timing metrics $\Lambda_i$ determined by the correlators in the correlator bank 3 are indicative of the presence of synchronization frames because the application of a correlation function to a bandpass filtered wireless communication signal $R_{Fi}$ containing a specifically designed synchronization sequence will yield a specific shape of the timing metrics $\Lambda_i$ at the point in time where the synchronization sequence has been received. Typically, the correlators in the correlator bank 3 will produce peak or plateau shaped timing metrics $\Lambda_i$ when a synchronization sequence has been detected.

Interference by a FMCW type radio signal, such as a FMCW RF signal—for example an FMCW radar sensor probing signal $P_i$—will alter the properties of the timing metrics $\Lambda_i$. For example, in case of a peak-shaped timing metrics $\Lambda_i$, the maximum value of the timing metrics $\Lambda_i$ derived from a synchronization frame affected by interference of an FMCW RF signal $P_i$ will be lower as compared to the maximum value of a timing metrics $\Lambda_i$ derived from a synchronization frame un-affected by interference of the FMCW RF signal $P_i$. The same applies to the peak-to-average ratio or any other property of the timing metrics $\Lambda_i$ so that it will be able to distinguish between those wireless communication frequency bandwidths $B_P$ that are deemed to be suitable for forming the basis of synchronization and those that are not due to the interference by an FMCW RF signal $P_i$. In general, the application of a binary hypothesis test to any one of those properties of the timing metrics $\Lambda_i$ renders it possible to make a distinction between different synchronization frames so that synchronization frames that are not interfered by the at least one FMCW RF signal $P_i$ are identified.

The correlators in the correlator bank 3 will further produce timing offsets $\Delta t_i$ based on their associated timing metrics A and synchronization sequences $S_i$ to provide an estimate of the start of the synchronization sequence $S_i$ within the synchronization frame. The bandpass filtered wireless communication signal $R_{Fi}$, the timing metrics A and the timing offsets $\Delta t_i$ are then passed on from each correlator in the correlator bank 3 to a synchronization selector 4 coupled downstream to the correlator bank 3.

The synchronization selector 4 is used to apply a binary hypothesis test to each of the received timing metrics A to determine whether or not the received synchronization frames have been interfered by the at least one FMCW RF signal $P_i$. The binary hypothesis test compares each of the timing metrics A and the timing offsets $\Delta t_i$ to each other and/or to a respective benchmark value so that the synchronization selector 4 is able to select one or more timing offsets $\Delta t_i$ for forming a set of synchronization frames $R_{Fj}$ that are deemed to be qualified for synchronizing the wireless network node 10 with the sending wireless network node 10*a*. In other words, the synchronization selector 4 is able to distinguish between those wireless communication frequency bandwidths $B_P$ that are deemed to be suitable for forming the basis of synchronization and those that are not due to the interference by a FMCW RF signal $P_i$.

The number j of synchronization frames $R_{Fj}$ which are identified to not be affected by interference of a FMCW RF signal will be at least one—due to the construction of the wireless communication frequency bandwidths $B_P$ being spaced apart by corresponding spectral distances $B_D$—but less or at most equal to the number i of synchronization frames $R_{Fi}$ actually sent.

The timing offsets $\Delta t_j$ selected by the synchronization selector 4 are then processed to derive a single timing offset $\Delta t$ in a timing offset estimator 5. The timing offset $\Delta t$ determined by the timing offset estimator 5 defines the starting point of the synchronization frames selected for synchronization by the synchronization selector 4. The timing offset estimator 5 may for example pick one of the timing offsets $\Delta t_j$ with the best result in the binary hypothesis test. Alternatively, it may be possible for the timing offset estimator 5 to calculate an average value for the timing offset $\Delta t$ based on averaging all of the timing offsets $\Delta t_j$ that have passed the binary hypothesis test applied in the synchronization selector 4. The timing offset estimator 5 may also apply any other algorithm for determining the timing offset $\Delta t$ that is able to improve the accuracy of the estimation of the timing offset $\Delta t$ as compared to the individual estimates for the timing offsets $\Delta t_1$.

A frequency offset estimator 6 is coupled downstream to the timing offset estimator 5. The frequency offset estimator 6 is configured to determine an estimation of a frequency offset $\Delta f$ between the synchronization frames transmitted by the sending wireless network node 10*a* and the received synchronization frames at the receiving wireless network nodes 10*b*. The frequency offset $\Delta f$ may for example be a carrier frequency offset that frequently occurs upon the local oscillator signal for down-conversion in the receiver being out of sync with carrier signal contained in the received signal. This mis-synchronization may for example be attributed to frequency mismatches of the local oscillators in transmitter and receiver or to Doppler effects occurring when the receiver is moving relative to the transmitter.

The frequency offset estimator 6 may for example determine separate estimates for each of the bandpass filtered wireless communication signals $R_{Fj}$ not affected by interference by FMCW radio type signals which are then combined into a single frequency offset $\Delta f$ by averaging or any other function that is suitable for increasing the accuracy of the estimate of the single frequency offset $\Delta f$ as compared to the individual frequency offset estimates of each of the bandpass filtered wireless communication signals $R_{Fj}$. Alternatively, the frequency offset estimator 6 may for example appropriately combine and process the information contained in all of the bandpass filtered wireless communication signals $R_{Fj}$ with a purpose-built method depending on the properties of each of the synchronization sequences $S_i$ in a synchronization frame.

The specific implementation of the frequency offset estimator 6 may depend on the desired or required accuracy of the frequency offset $\Delta f$. The frequency offset estimation performed by the frequency offset estimator 6 may occur in the time interval corrected by the timing offset $\Delta t$ as estimated by the timing offset estimator 5 in which the received signal R is assumed to contain the synchronization frame(s).

The synchronization frames used to synchronize the wireless communication within the wireless communication network 20 may be based on any synchronization protocol that can be utilized in a sender-to-receiver synchronization method.

The synchronization sequences transmitted within the of the synchronization frames may be designed according to desired auto-correlation and/or cross-correlation properties in order to be able to precisely detect the start of a synchronization frame and to determine a frequency offset between transmitter and receiver. For example, a synchronization sequence may be implemented using Constant Amplitude Zero Autocorrelation waveforms (CAZAC). CAZAC sequences are periodic complex-valued signals with modulus one and out-of-phase periodic autocorrelations equal to zero. Such CAZAC sequences have specifically designed autocorrelation and cross-correlation properties that allow for a precise detection of the start of a synchronization frame. Moreover, a frequency offset between the transmitter and the receiver of the synchronization frame may be determined from such CAZAC sequences.

Examples for such CAZAC sequences are Frank-Zadoff-Chu sequences, Walsh-Hadamard codes, Barker sequences, prime length Legendre sequences or Neuman-Hoffmann sequences. Synchronization sequences may be generated by any suitable synchronization protocol. The synchronization frames containing the synchronization sequences may precede, succeed or be embedded within signal carrying data. The synchronization frames may be sent out periodically with fixed or adaptable periodicity or at arbitrarily or randomly chosen time slots.

Figure 6:
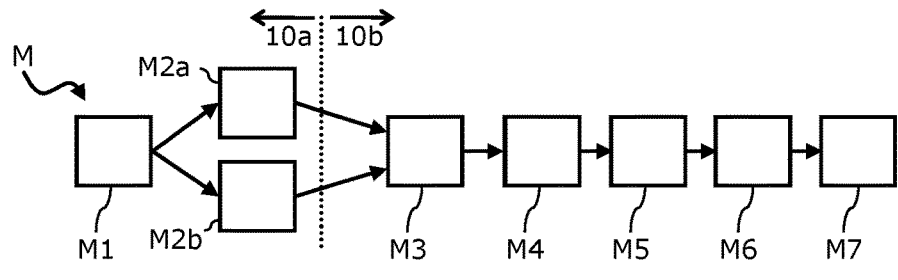
FIG. 6 depicts blocks of a flow diagram of a method for synchronizing wireless network nodes according to some embodiments of the disclosure herein.

FIG. 6 depicts blocks of a flow diagram of a method M for synchronizing wireless network nodes, such as for example wireless network nodes 10 of a wireless communication network 20 as illustrated in FIG. 1. The method M may for example be implemented using a sending wireless network node 10*a* as exemplarily illustrated in FIG. 1 and wireless network nodes 10 as receiving wireless network nodes 10*a* as exemplarily illustrated in FIG. 4. The method M may for example be used to synchronize wirelessly communicating avionics components, such as might be present in an aircraft A as exemplarily depicted in FIG. 5.

The method M as shown in FIG. 6 involves methods steps M1, M2*a* and M2*b* to be performed by a sending wireless network node 10*a*, such as for example a base station of the wireless communication network 20, while the subsequent steps M3, M4, M5, M6 and M7 are to be performed in one or more receiving wireless network nodes 10*b* of the wireless communication network 20. The sending wireless network node 10*a* and the receiving wireless network node 10*b* need to synchronize their communication with each other.

In a first step M1, a maximum value for a frequency content per unit of time of at least one frequency-modulated continuous wave, FMCW, radio-frequency signal, such as an FMCW radar probing signal P, interfering with the wireless communication network 20 is determined or otherwise obtained, for example preconfigured. The FMCW RF signal P may for example be a sawtooth pattern, triangle pattern or staircase pattern signal for which the speed of change of its operating frequency is limited by an upper boundary, i.e. for a given unit of time the operating frequency of the FMCW RF signal P does not change more than a maximum threshold value. This maximum value may be measured by detecting interfering FMCW RF signals P and evaluating the frequency properties of the detected FMCW RF signals P. Alternatively or additionally, it may be possible to use pre-determined maximum values for typically occurring FMCW RF signals P under known circumstances, such as for example for known FMCW radar sensors the ranging characteristics of which are known in advance. It may also be possible to estimate a worst case scenario for possibly interfering FMCW RF signals P and—for reasons of safety—to define the maximum value under this worst case assumption.

In a second partial step M2*a* a first synchronization frame containing a first synchronization sequence $S_1$ is transmitted by the sending wireless network node 10*a* in a first wireless communication frequency bandwidth $B_P$. Simultaneously, i.e. at the same time, a third partial step M2*b* involves transmitting at least one second synchronization frame containing a second synchronization sequence $S_2$ in a second wireless communication frequency bandwidth $B_P$. As exemplarily illustrated in FIGS. 3A and 3B, the second wireless communication frequency bandwidth $B_P$ is spaced apart from the first wireless communication frequency bandwidth $B_P$ by a certain spectral distance $B_D$ so that the synchronization frames may be sent out in a wireless communication signal R to be received by receiving wireless network nodes 10*b* of the wireless communication network 20.

This spectral distance $B_D$ guarantees that the interfering FMCW RF signal P (exemplarily shown in FIG. 3A) will—in the worst case—only occupy one of the wireless communication frequency bandwidths during the transmission of the first and second synchronization frames. The spectral distance $B_D$ is selected to be larger or equal to the product of the determined maximum value for the frequency content per unit of time of the at least one FMCW RF signal P and the duration $T_P$ of the first and second synchronization sequences $S_1$ and $S_2$.

In a fourth step M3, the first synchronization frame and the at least one second synchronization frame are received by at least one receiving wireless network node 10*b* of the wireless communication network 20. In a fifth step M4, the wireless communication signal R is filtered for the first synchronization frame in the first wireless communication frequency bandwidth $B_P$ and for the at least one second synchronization frame in the second wireless communication frequency bandwidth $B_P$. The correspondingly obtained filtered wireless communication signals $R_{Fi}$ contain the first and at least on second synchronization frames, respectively.

The receiving wireless network node 10b then applies a correlation function to the first and second synchronization sequences $S_1$ and $S_2$ contained in the received and filtered first and second synchronization frames in a sixth step M5. This correlation function—for example an autocorrelation function—allows the receiving wireless network node 10b to determine first and second timing metrics associated with the first and second synchronization sequences, respectively. The timing metrics typically result in peak or plateau shaped signals, the peak or plateau coinciding with the presence of a synchronization sequence within the time window in which the received wireless communication signal R is processed.

Interference by a FMCW RF signal P will change the properties of the determined timing metrics. For example, in case of a peak-shaped timing metric, the maximum value of a timing metric derived from a synchronization frame affected by interference of a FMCW RF signal P will be lower as compared to the maximum value of a timing metric derived from a synchronization frame not affected by interference of the FMCW radar probing signal P.

Therefore, the receiving wireless network nodes 10b will be able to apply a binary hypothesis test to each of the first and second timing metrics in a seventh step M6 in order to determine whether or not the received first and second synchronization frames have been interfered by the at least one FMCW radar probing signal P. On the basis of the outcome of this binary hypothesis test, the receiving wireless network nodes 10b are able to select, in an eighth step M7, at least one of the first synchronization frame and the at least one second synchronization frame for synchronizing with the sending wireless network node 10a. In other words, the receiving wireless network nodes 10b will select only those synchronization frames for synchronizing with the sending wireless network node 10a which have been tested to be essentially un-affected by interference of the FMCW RF signal P.

In some cases, there will only be a single synchronization frame un-affected by interference of the FMCW RF signal P, while in other cases, more than one synchronization frame may be un-affected by interference of the FMCW radar probing signal P. In the latter case, the receiving wireless network nodes 10a may select a set of at least two synchronization frames yielding a set of time offsets defining the starting points of the set of synchronization frames. This set of time offsets may be subject to normalization in order to derive an average time offset for the determined set of time offsets.

Synchronizing the at least one receiving wireless network node 10b with the sending wireless network node 10a may include determining a time offset defining the starting point of the at least one selected synchronization frame and/or a frequency offset between the synchronization frames transmitted by the sending wireless network node 10a and the received synchronization frames at the at least one receiving wireless network node 10b. In case that only a single synchronization frame is determined to be un-affected by interference of FMCW type radio signals, this single synchronization frame is used for determining A selected set of at least two synchronization frames yielding a set of time offsets defining the starting points of the set of synchronization frames may also be used to determine a frequency offset between the synchronization frames transmitted by the sending wireless network node 10a and the received synchronization frames at the at least one receiving wireless network node 10b. The frequency offset may for example be a carrier frequency offset that frequently occurs upon the local oscillator signal for down-conversion in the receiver being out of sync with carrier signal contained in the received signal. This mis-synchronization may for example be attributed to frequency mismatches of the local oscillators in transmitter and receiver or to Doppler effects occurring when the receiver is moving relative to the transmitter Although specific reference is made herein to wireless communication networks in aircraft, it is to be understood that the disclosed embodiments may be utilized with any type of wireless communication network. For example, wireless communication networks within the ambit of this disclosure may be used in other aerial vehicles, naval vehicles such as ships, ground-based vehicles such as cars, trucks, trains, and/or stationary or quasi-stationary settings such as buildings, manufacturing sites, public places or similar. Any of the principles and advantages discussed herein can be implemented in association with RF circuitry configured to process signals in a range from about 30 kHz to 300 GHz, such as in a range from about 450 MHz to 8.5 GHz.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the systems and aircraft infrastructure can be applied accordingly to the aircraft or spacecraft according to the disclosure herein and the method according to the disclosure herein, and vice versa.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for synchronizing wireless network nodes of a wireless communication network, the method comprising:

by a sending wireless network node in the wireless communication network:
  determining or obtaining a maximum value for a frequency content per unit of time of at least one frequency-modulated continuous wave (FMCW) radio-frequency signal interfering with the wireless communication network;
  transmitting a first synchronization frame containing a first synchronization sequence in a first wireless communication frequency bandwidth; and
  transmitting at least one second synchronization frame simultaneously to the first synchronization frame in a wireless communication signal, the at least one second synchronization frame containing a second synchronization sequence in at least one second wireless communication frequency bandwidth, the at least one second wireless communication frequency bandwidth being spaced apart from the first wireless communication frequency bandwidth and among each other by a spectral distance that is larger or equal to the product of the determined maximum value for the frequency content per unit of time of the at least one FMCW radio-frequency signal and a duration of the first and second synchronization sequences; and by at least one receiving wireless network node in the wireless communication network:
  receiving the wireless communication signal containing the first synchronization frame and the at least one second synchronization frame;
  filtering the wireless communication signal for the first synchronization frame in the first wireless communication frequency bandwidth and for the at least one second synchronization frame in the at least one second wireless communication frequency bandwidth;
  applying a correlation function to the first and second synchronization sequences contained in the received first and second synchronization frames to determine first and second timing metrics associated with the first and second synchronization sequences, respectively;
  applying a binary hypothesis test to each of the first and second timing metrics to determine whether or not the received first and second synchronization frames have been interfered by the at least one FMCW radio-frequency signal; and
  selecting at least one of the filtered first synchronization frame and the at least one second filtered synchronization frame for synchronizing the at least one receiving wireless network node with the sending wireless network node based on an outcome of the applied binary hypothesis test so that synchronization frames that are not interfered by the at least one FMCW radio-frequency signal are identified and selected.

2. The method of claim 1, wherein the first and second synchronization sequences are constant amplitude zero auto-correlation, CAZAC, (CAZAC) waveforms.

3. The method of claim 2, wherein the first and second synchronization sequences are Frank-Zadoff-Chu sequences, Walsh-Hadamard codes, Barker sequences, prime length Legendre sequences or Neuman-Hoffmann sequences.

4. The method of claim 1, wherein applying the correlation function to the first and second synchronization sequences includes applying an autocorrelation function to the first and second synchronization sequences.

5. The method of claim 1, wherein synchronizing the at least one receiving wireless network node with the sending wireless network node includes determining a time offset defining a starting point of the at least one selected synchronization frame.

6. The method of claim 1, wherein selecting at least one of the first synchronization frame and the at least one second synchronization frame includes selecting a set of synchronization frames and synchronizing the at least one receiving wireless network node with the sending wireless network node includes determining a set of time offsets defining starting points of the set of synchronization frames and determining an average time offset for the determined set of time offsets.

7. The method of claim 1, wherein synchronizing the at least one receiving wireless network node with the sending wireless network node includes determining a frequency offset between the sending wireless network node and the at least one receiving wireless network node.

8. A wireless network node for use in a wireless communication network interfered by frequency-modulated continuous wave (FMCW) type radio signals, the wireless network node being configured to:
  determine or obtain a maximum value for a frequency content per unit of time of at least one FMCW radio-frequency signal interfering with the wireless communication network;
  transmit a first synchronization frame containing a first synchronization sequence in a first wireless communication frequency bandwidth; and
  transmit at least one second synchronization frame simultaneously to the first synchronization frame in a wireless communication signal, the at least one second synchronization frame containing a second synchronization sequence in at least one second wireless communication frequency bandwidth, the at least one second wireless communication frequency bandwidth being spaced apart from the first wireless communication frequency bandwidth and among each other by a spectral distance that is larger or equal to a product of the determined maximum value for the frequency content per unit of time of at least one FMCW radar probing signal and a duration of the first and second synchronization sequences.

9. The wireless network node of claim 8, wherein the first and second synchronization sequences are Frank-Zadoff-Chu sequences, Walsh-Hadamard codes, Barker sequences, prime length Legendre sequences or Neuman-Hoffmann sequences.

10. A wireless network node for use in a wireless communication network interfered by frequency-modulated continuous wave (FMCW) type radio signals, the wireless network node being configured to:

receive a wireless communication signal from a sending wireless network node in the wireless communication network containing a first synchronization frame and at least one second synchronization frame simultaneously to the first synchronization frame, the first synchronization frame containing a first synchronization sequence in a first wireless communication frequency bandwidth, and the at least one second synchronization frame containing a second synchronization sequence in at least one second wireless communication frequency bandwidth, the at least one second wireless communication frequency bandwidth being spaced apart from the first wireless communication frequency bandwidth and among each other by a spectral distance that is larger or equal to a product of a determined maximum value for the frequency content per unit of time of at least one FMCW radio-frequency signal and a duration of the first and second synchronization sequences;

filter the wireless communication signal for the first synchronization frame in the first wireless communication frequency bandwidth and for the at least one second synchronization frame in the second wireless communication frequency bandwidth;

apply a correlation function to the first and second synchronization sequences contained in the received and filtered first and second synchronization frames, respectively, to determine first and second timing metrics that are associated with the first and second synchronization sequences, respectively;

apply a binary hypothesis test to each of the first and second timing metrics to determine whether or not the received first and second synchronization frames have been interfered by the at least one FMCW radio-frequency signal; and select at least one of the first synchronization frame and the at least one second synchronization frame for synchronizing the wireless network node with the sending wireless network node based on an outcome of the applied binary hypothesis test so that synchronization frames that are not interfered by the at least one FMCW radio-frequency signal are identified and selected.

11. The wireless network node of claim 10, wherein the wireless network node is configured to synchronize with the sending wireless network node by determining a time offset defining a starting point of the at least one selected synchronization frame.

12. The wireless network node of claim 10, wherein the wireless network node is configured to select at least one of the first synchronization frame and the at least one second synchronization frame by selecting a set of synchronization frames and to synchronize with the sending wireless network node by determining a set of time offsets defining starting points of the set of synchronization frames and determining an average time offset for the determined set of time offsets.

13. The wireless network node of claim 10, wherein the wireless network node is configured to synchronize with the sending wireless network node by determining a frequency offset between the sending wireless network node and the at least one wireless network node.

14. A wireless communication network, comprising:

at least one sending wireless network node for use in a wireless communication network interfered by frequency-modulated continuous wave (FMCW) type radio signals, the wireless network node being configured to:

determine or obtain a maximum value for a frequency content per unit of time of at least one FMCW radio-frequency signal interfering with the wireless communication network;

transmit, in a wireless communication signal, a first synchronization frame containing a first synchronization sequence in a first wireless communication frequency bandwidth; and transmit, in the wireless communication signal, at least one second synchronization frame simultaneously to the first synchronization frame, the at least one second synchronization frame containing a second synchronization sequence in at least one second wireless communication frequency bandwidth, the at least one second wireless communication frequency bandwidth being spaced apart from the first wireless communication frequency bandwidth and among each other by a spectral distance that is larger or equal to a product of the determined maximum value for the frequency content per unit of time of the at least one FMCW radar probing signal and a duration of the first and second synchronization sequences.

15. An aircraft comprising a wireless communication network according to claim 14.

* * * * *